(12) United States Patent
Shattil

(10) Patent No.: US 6,331,837 B1
(45) Date of Patent: Dec. 18, 2001

(54) SPATIAL INTERFEROMETRY MULTIPLEXING IN WIRELESS COMMUNICATIONS

(75) Inventor: Steve J. Shattil, Boulder, CO (US)

(73) Assignee: GenghisComm LLC, Boulder, CO (US)

(*) Notice: Subject to any disclaimer, the term of this patent is extended or adjusted under 35 U.S.C. 154(b) by 0 days.

(21) Appl. No.: 09/324,206

(22) Filed: Jun. 1, 1999

Related U.S. Application Data

(63) Continuation-in-part of application No. 08/862,859, filed on May 23, 1997, now Pat. No. 6,008,760.

(51) Int. Cl.$^7$ ............................................. G01S 3/16
(52) U.S. Cl. .................................... 342/378; 342/383
(58) Field of Search ................................. 342/378, 380, 342/382, 383

(56) References Cited

U.S. PATENT DOCUMENTS

| | | | |
|---|---|---|---|
| 4,734,701 | * 3/1988 | Grobert | 342/380 |
| 4,931,977 | * 6/1990 | Klemes | 364/581 |
| 5,414,699 | * 5/1995 | Lee | 370/18 |
| 5,471,647 | 11/1995 | Gelach . | |
| 5,515,378 | 5/1996 | Roy . | |
| 5,523,526 | 6/1996 | Shattil . | |
| 5,592,490 | 1/1997 | Barratt . | |
| 5,634,199 | 5/1997 | Gerlach . | |
| 5,671,168 | 9/1997 | Liu . | |
| 5,796,779 | * 8/1998 | Nussbaum et al. | 375/267 |
| 5,819,168 | 10/1998 | Golden . | |
| 5,828,658 | 10/1998 | Otterslen . | |
| 5,875,216 | * 2/1999 | Martin | 375/347 |
| 5,887,038 | 3/1999 | Golden . | |
| 5,930,243 | 7/1999 | Parish . | |
| 5,973,642 | 10/1999 | Li . | |
| 6,044,120 | 3/2000 | Bar-Darid . | |

FOREIGN PATENT DOCUMENTS

WO 95/03686   2/1995   (WO) .

OTHER PUBLICATIONS

Shattil, "Method and Apparatus for Canceling Interference in Electromagnetic Receivers," U.S. Pat Appl. No. 09/433,196 Claims Priority date of Jul. 22, 1994.

* cited by examiner

*Primary Examiner*—Dao Phan
(74) *Attorney, Agent, or Firm*—Steven J. Shattil

(57) ABSTRACT

Spatial multiplexing techniques achieve substantial improvements in frequency reuse in microwave communications. The spatial demultiplexing techniques use amplitude and phase differences of received signals at spatially separated antennas to separate interfering signals. A set of complex weights is generated based on the differences of the received signals. The received signals are weighted and summed to cancel interference and separate the signals. Beamforming operations in an antenna array provide rejection of intersymbol interference and reduce the number of antennas needed to cancel interference. A spatial demultiplexing technique using multicarrier signals eliminates the requirement for multiple receiver antennas. The spatial demultiplexing technique is also applied to separating received signals that have polarization time, and frequency diversity.

35 Claims, 10 Drawing Sheets

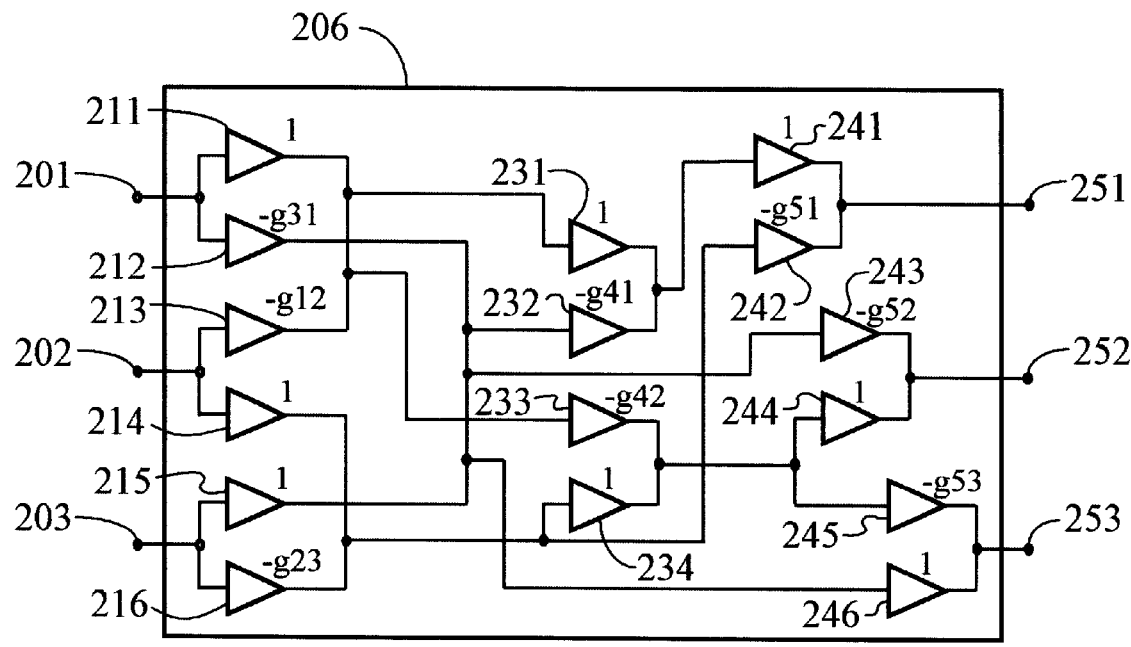
FIG. 9
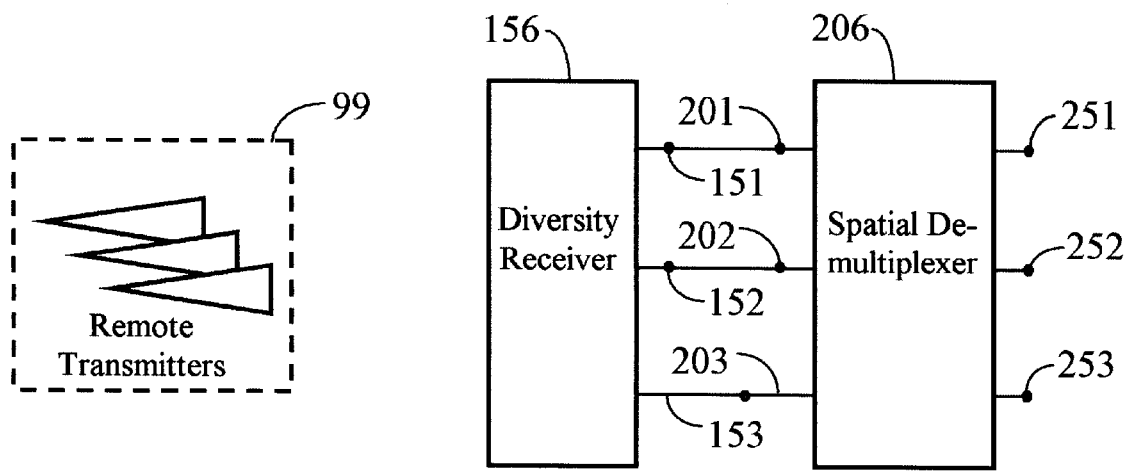
FIG. 10A  FIG. 10B

SPATIAL INTERFEROMETRY MULTIPLEXING IN WIRELESS COMMUNICATIONS

This is a continuation-in-part of Ser. No. 08/862,859, Filed May 23, 1997, now U.S. Pat. No. 6,008,760.

BACKGROUND OF THE INVENTION

The present invention relates generally to wireless radio-frequency (RF) communication systems. In particular, it relates to isolation systems that separate a desired receive signal from interfering signals in a RF communication system. Interfering signals include all signals received by a receiving antenna that cause co-channel interference.

Some techniques for reducing co-channel interference include frequency separation, time division, orthogonal polarization, and spatial separation. Further reduction of interference requires some type of cancellation. U.S. Pat. No. 5,432,522 shows a canceller that reduces cross-polarization interference in two orthogonally polarized channels. U.S. Pat. No. 5,515,378 shows how adaptive beamforming performed with a phased array provides spatial multiplexing and demultiplexing of wireless communication channels. Each element of the array has an associated electrical signal that is adjusted by a complex-valued weight, then summed to provide an antenna beam pattern having nulls (canceled responses) in a predetermined direction for a particular signal frequency. Transmission of wideband or multiple-frequency signals causes distortion of the main beam and variance in the location and depth (beam-pattern magnitude) of the nulls.

Beamforming can provide exceptional performance in a fading environment, which is due to the ability of an array to select signals based on the signals directions of arrival. As strong signals are selected for reception, destructive cancellation caused by reflected components arriving at the array elements is mitigated by the placement of nulls. Null placement is also effective in mitigating co-channel interference. However, problems with beamforming include the inability to resolve co-located or closely spaced radio sources unless multipath components of these signals are tracked. In addition, the number of antenna elements limits the number of co-channel interference sources that can be nulled. This is a significant problem because each multipath component arriving at the array is a source of interference. Therefore, a small number of transmitters may provide a large number of interference sources.

SUMMARY OF THE INVENTION

The present invention addresses the lack of available frequency bandwidth allocation for wireless RF communications. Effects of these problems include limited data-transmission capacity, co-channel interference, and limited access to wireless services resulting from increased demand for the services. Substantial improvements in frequency reuse are implemented through techniques of Spatial Interferometry Multiplexing (SIM). SIM is a process of transmitting, receiving, and separating multiple signals that interfere with each other. Applications of this new technique are directed toward, but not limited to, stationary wireless communication systems.

One embodiment of the present invention is a microwave antenna array that receives a plurality of signals in the same frequency channel that are transmitted from a remote location. The antenna array uses a spatial demultiplexer to resolve signals from even co-located sources. Consequently, the spatial demultiplexer provides a frequency reuse improvement of at least several orders of magnitude over the prior art.

A first object of the invention is to provide a new type of spatial demultiplexing technique to resolve closely spaced and co-located sources by using spatial gain distributions of the received signals. A spatial gain distribution is the variation of signal amplitude with respect to space. This results in one antenna receiving a different signal strength relative to another antenna when the antennas are spatially separated. The signal amplitude may be complex valued and, thus, includes phase information. Spatial gain distributions are a natural phenomenon caused by a large number of factors, including multipath fading, shadowing, diffraction, propagation loss, and adsorption. The present invention makes use of spatial gain distributions to enhance interference rejection.

In the present invention, the spatial gain distribution of each receive signal is measured to determine ratios of co-channel interference at the antenna elements. These ratios are used to determine weights in a cancellation (spatial demultiplexing) circuit, which separates the received signals. Adjustments to the spatial gain distribution may be performed by aperture synthesis, beam steering, or interferometric combining of a plurality of signals at either or both the transmit antenna(s) and the receive antenna. Received signals may be separated to recover a single desired signal transmitted by one of a plurality of different transmitters. Received signals may be separated to recover a plurality of desired signals from a multi-element transmitter that generates desired signals having different spatial gain characteristics at the receiving antenna.

Spatial demultiplexing may be performed following beamforming operations in an antenna array. Beamforming changes the effective spatial gain characteristics of received signals "seen" by the array. Thus, the different antenna patterns resulting from different beamforming parameters allow multiple unique inputs to the spatial demultiplexing process.

Another object of the invention is to separate interfering signals received at an antenna array by spatial demultiplexing a plurality of outputs from different beamforming processes. This type of spatial demultiplexing reduces the number of spatially separated antenna elements required to separate interfering received signals.

Spatial gain characteristics of a received signal vary with the location of the receiving antennas, time of reception, and frequency of the transmitted signal. Therefore, another object of the invention is to provide diversity-reception techniques that separate received signals based on space diversity, time diversity, and frequency diversity. Another application of the demultiplexing technique includes separating polarized received signals that have known cross-polarization terms.

Another object of the invention is to provide spatial demultiplexing of multicarrier signals. Benefits of multicarrier protocols include simplified processing, improved bandwidth efficiency, and the ability to transmit large data rates over narrowband signals (which simplifies the spatial demultiplexing process).

Due to their increased size and the problem of preserving a particular orientation with respect to a base station, antenna arrays are not practical for mobile and hand-held units. Typically, an omnidirectional whip-style antenna is used on a mobile unit, and the base station is equipped with an array.

Thus, an object of the present invention is to provide a receiver with a spatial demultiplexing system that uses a single omnidirectional antenna. An embodiment of this invention is demonstrated with a preferred multicarrier protocol known as Carrier Interferometry Multiple Access (CIMA). CIMA provides redundant transmissions on different carrier frequencies. However, this redundancy does not diminish the bandwidth efficiency. In fact, superior bandwidth efficiency is achieved because the CIMA carriers combine in the time domain to produce short impulses. Frequency diversity in the CIMA protocol also enables spatial demultiplexing of the received CIMA signals. Different carriers have different spatial gain distributions (in a multipath fading environment) due to their differences in frequency. Therefore, each transmitted signal has a unique spatial gain distribution represented by the individual amplitudes of its component carriers.

The objects of the present invention recited above; as well as additional objects, are apparent in the description of the preferred embodiments.

BRIEF DESCRIPTION OF THE DRAWINGS

FIG. 9 illustrates a cancellation method of the present invention for separating three desired received signals that interfere with each other.

FIG. 10A shows a plurality of remote transmitters that transmit signals to a spatial demultiplexer of the present invention shown in FIG. 10B.

FIG. 10B shows a spatial demultiplexer of the present invention connected to a diversity receiver that receives transmitted electromagnetic signals from a plurality of remote transmitters shown in FIG. 10A.

DETAILED DESCRIPTION OF PREFERRED EMBODIMENTS

Figure 1:
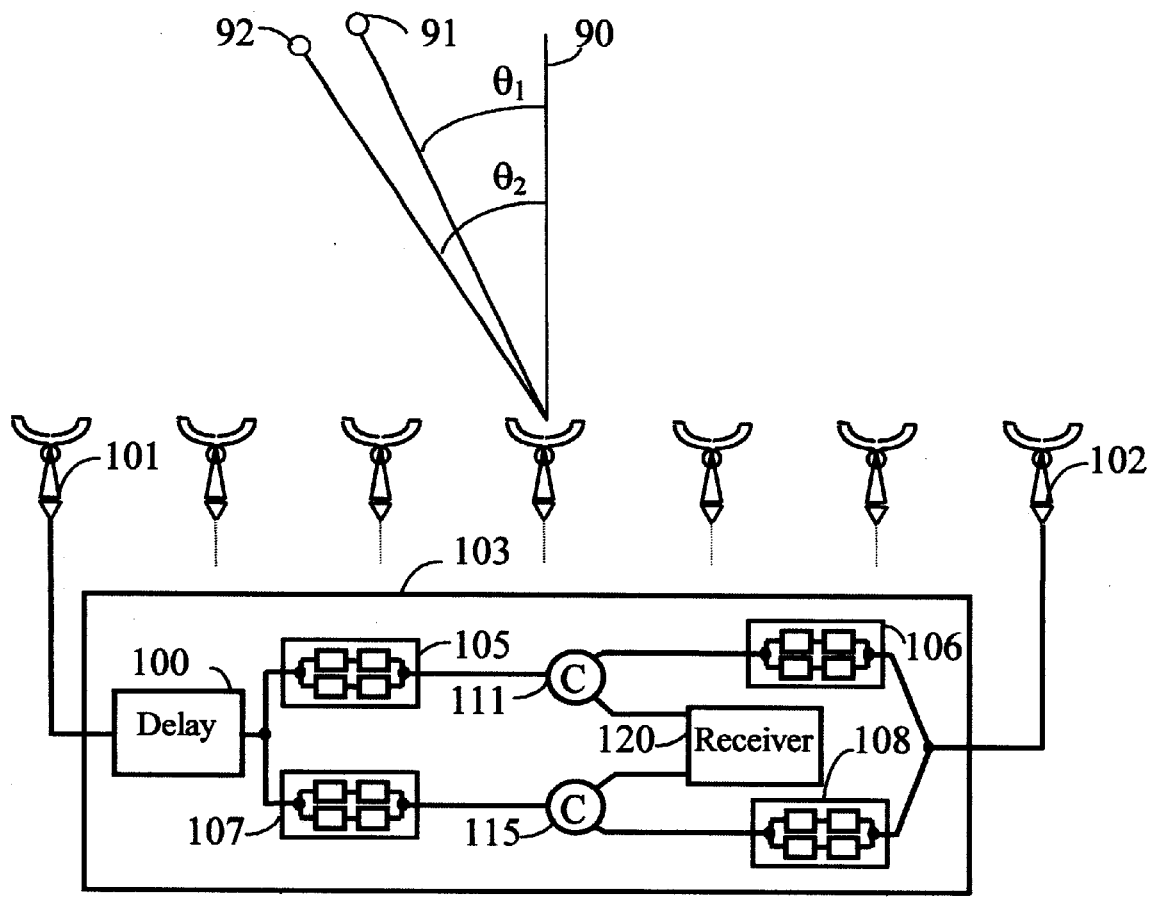
FIG. 1 is an embodiment of a two-element antenna array of the present invention.

FIG. 1 shows a spatial demultiplexer 103 of the present invention that makes use of known spatial gain variations of a plurality of receive signals $s_n(t)$ across an antenna array. The antenna array has a plurality M of antenna elements 101 and 102. For simplicity, the case M=2 is shown. Two remote transmit sources 91 and 92 generate transmissions $S_{Tn}=s_n(t)\sin(\omega t+\psi_n)$ where $s_n(t)$ is an $n^{th}$ amplitude modulation of a transmitted carrier signal. An electrical receive signal $r_m(t)$ is produced at each antenna element by the incoming signals $s_n(t)$, and is expressed by:

$$r_m(t) = \sum_{n=1}^{N} a_n s_n(t) e^{i\pi(x_m \sin\theta_n + y_m \cos\theta_n)} + n_m(t)$$

where $a_n$ is the antenna gain, $x_m$ and $y_m$ are Cartesian coordinates of the $m^{th}$ antenna element location normalized by signal wavelength $\lambda$, $\theta_n$ is the angle of incidence of the signals $s_n(t)$, and $n_m(t)$ is a noise component corresponding to the $m^{th}$ antenna element. In this case, the two antenna elements 101 and 102 receive at least two incoming signals $s_1(t)$ and $s_2(t)$ from sources 91 and 92 and induce two receive signals:

$r_1(t) = a_1 s_1(t) e^{i\pi(x_1 \sin\theta_1 + y_1 \cos\theta_1)} + a_2 s_2(t) e^{i\pi(x_1 \sin\theta_2 + y_1 \cos\theta_2)}$ $r_2(t) = a_1 s_1(t) e^{i\pi(x_2 \sin\theta_1 + y_2 \cos\theta_1)} + a_2 s_2(t) e^{i\pi(x_2 \sin\theta_2 + y_2 \cos\theta_2)}$ If the source 91 and 92 are very close together in angular position: $\theta_1 \approx \theta_2 \equiv \theta$, then the equations for the receive signals are simplified:

$r_1(t) = e^{i\pi(x_1 \sin\theta + y_1 \cos\theta)}[a_1 s_1(t) + a_2 s_2(t)]$ $r_2(t) = e^{i\pi(x_2 \sin\theta + y_2 \cos\theta)}[a_1 s_1(t) + a_2 s_2(t)]$ The exponent represents a steer vector of the array excitation and merely acts as a scaling factor for the expressions in the brackets, which are identical for the two receive signals $r_1(t)$ and $r_2(t)$. These two equations are algebraically identical and, therefore reduce to a single equation with two unknown quantities $s_1(t)$ and $s_2(t)$. Therefore, the two signals $s_1(t)$ and $s_2(t)$ cannot be resolved. In order to explicitly solve for the unknowns $s_1(t)$ and $s_2(t)$, it is necessary to develop at least two algebraically unique equations in $s_1(t)$ and $s_2(t)$. This is accomplished by providing the incoming signals with different spatial gain characteristics: $s_n(t) \equiv s_n(x,y,t)$.

The magnitude of each incoming signal at each antenna 101 and 102 varies in accordance with the spatial gain characteristics of the signal: $s_{mn} \equiv s_n(t)\beta_{mn}$, where $\beta_{mn}$ is a measured weight factor expressing the complex amplitude of the signal $s_n(t)$ at the $m^{th}$ antenna element. The received signals are expressed by the following equations:

$r_1(t) = C_1[a_1 s_1(t)\beta_{11} + a_2 s_2(t)\beta_{12}]$ $r_2(t) = C_2[a_1 s_1(t)\beta_{21} + a_2 s_2(t)\beta_{22}]$ The constants $C_1$ and $C_2$ represent the steering vector and are comprised of known quantities. These constants can be absorbed into the values of , or the measured receive signals $r_1(t)$ and $r_2(t)$. Thus, the above equations allow a method of solving for the signals $s_1(t)$ and $s_2(t)$ explicitly. The signals $s_1(t)$ and $s_2(t)$ can be separated by weighting and summing the receive signals $r_1(t)$ and $r_2(t)$ in the following manner:

$$r_1(t) - \frac{\beta_{11}}{\beta_{21}} r_2(t) = a_2 s_2(t) \left[ \beta_{12} - \frac{\beta_{22}\beta_{11}}{\beta_{21}} \right]$$

$$r_1(t) - \frac{\beta_{12}}{\beta_{22}} r_2(t) = a_1 s_1(t) \left[ \beta_{11} - \frac{\beta_{12}\beta_{21}}{\beta_{22}} \right]$$

These equations identify the boundary condition $\beta_{11}\beta_{22} \neq \beta_{12}\beta_{21}$, which represents the spatial gain profile of the signals $s_1(t)$ and $s_2(t)$ necessary for allowing resolution of the two signals $s_1(t)$ and $s_2(t)$. This example assumes that noise received by the antennas 101 and 102 is negligible.

Each of the spatially separated antenna elements 101 and 102 receive a plurality of signals $s_1(t)$ and $s_2(t)$ that combine to create known spatial gain characteristics $\beta_{mn}$ at the receiving elements 101 and 102. Furthermore, the proportionality of the spatial gain characteristics $\beta_{mn}/\beta_{m'n}$, $m \neq m'$ at each antenna element 101 and 102 is unique, as required by the boundary conditions described above. The first receive signal $r_1(t)$ is generated by antenna 102. The second receive signal $r_2(t)$ is from antenna element 101 and may be delayed by a delay element 100.

In this example, the delay element 100 compensates for the difference in transit time for the transmitted signals received by the antenna elements 101 and 102. This is done to maximize reception time of the desired signals. The delay element 100 is useful for this particular case (shown in FIG. 1) where most of each plurality of received signals $s_1(t)$ and $s_2(t)$ are assumed to arrive at antenna 101 before being received by antenna 102. Although a separate delay device (not shown) may be used for each received signal $s_1(t)$ and $s_2(t)$ (and at either antenna 101 and 102), only a single delay element 100 is shown here. Only the delay element 100 is required because sources 91 and 92 are in close angular proximity and it is assumed that signals received from these sources will arrive from approximately the same direction. The delay element 100 is particularly useful when the separation of the antennas 101 and 102 is large.

The delayed signal $r_2(t)$ is split into a first and a second component $r_{21}(t)$ and $r_{22}(t)$. The first component $r_{21}(t)$ has a weight $\beta_{11}/\beta_{21}$ applied to it by a first weighting element 105, and the second component $r_{22}(t)$ has a weight $\beta_{12}/\beta_{22}$ applied to it by a second weighting element 107. It is apparent that delay could have been incorporated into any of the weighting elements, such as elements 105 and 107. The first receive signal $r_1(t)$ from antenna element 101 is split into a first and a second component $r_{11}(t)$ and $r_{12}(t)$. The first component $r_{11}(t)$ is coupled through a weighting element 106 and then into a first combining circuit 111. In this case, the signals $s_1(t)$ and $s_2(t)$ do not have significant distributed-frequency characteristics (broadband or multiple frequencies), so the weighting element 106 provides neither amplitude adjustment nor delay to the first component $r_{11}(t)$. Likewise, the second component $r_{12}(t)$ is coupled through a weighting element 108 into a second combining circuit 115. The weighting element 108 also provides neither amplitude adjustment nor delay to signal $r_{12}(t)$. The weighted first component $r_{21}(t)$ is subtracted from the first signal's first component $r_{11}(t)$ in the first combining circuit 111. The weighted second component $r_{22}(t)$ is subtracted from the first signal's second component $r_{12}(t)$ in the second combining circuit 115. Outputs of the combining circuits 111 and 115 are proportional to the transmitted signals $s_1(t)$ and $s_2(t)$, respectively. These outputs are coupled to a receiver 120, which may provide further signal processing (such as equalization) or may adjust the weights applied to the signals to optimize a signal-to-noise or signal-to-noise-plus-interference measurement.

If the signals $s_1(t)$ and $s_2(t)$ received by the antennas 101 and 102 have distributed-frequency characteristics that cause the receive signals $r_1(t)$ and $r_2(t)$ to have variable magnitudes with respect to frequency, the weighting elements 105, 106, 107, and 108 may include frequency-dependent gain components (not shown). Frequency-dependent gain components (not shown) may separate received signals and provide different complex gains to the separated frequency components to cancel interfering signals.

Figure 8:
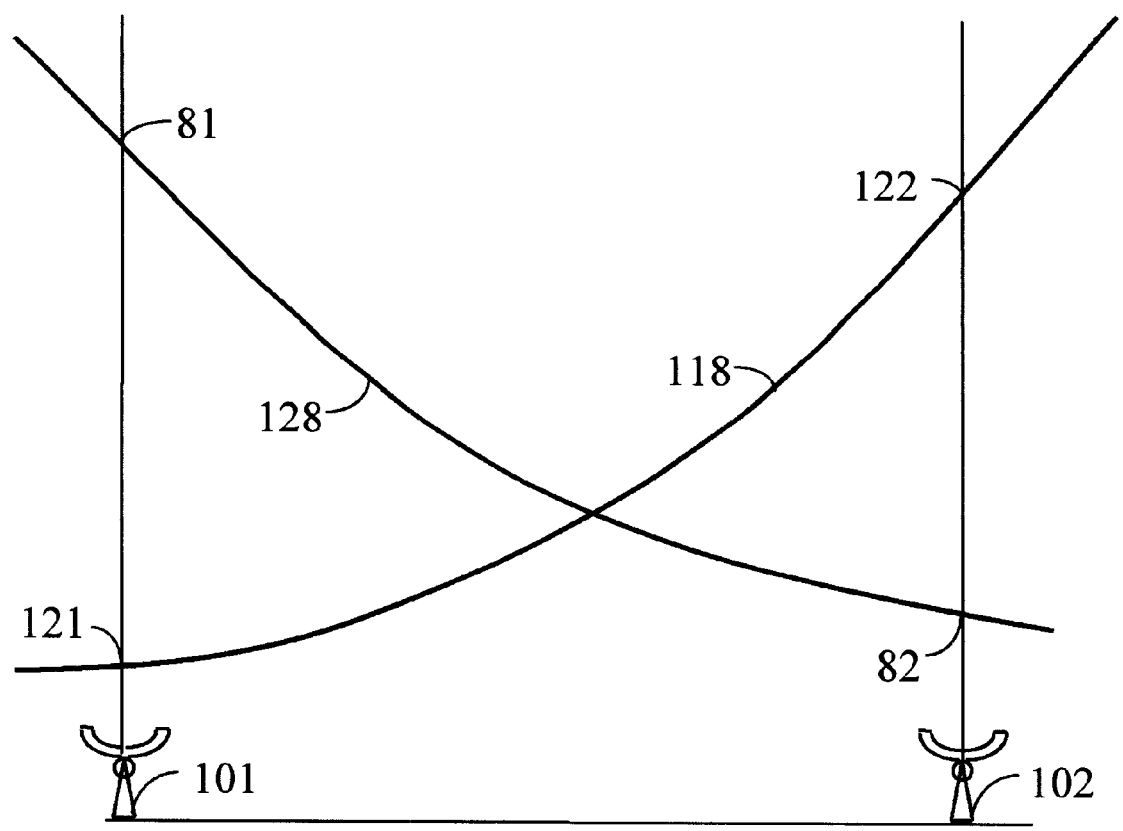
FIG. 8 is a graphic representation of spatial gain intensities of two received signals across two antenna elements of the antenna array shown in FIG. 1.

FIG. 8 is a plot of intensity profiles (from spatial gain distributions) 118 and 128 of signals transmitted by the remote sources 91 and 92 in the vicinity of antennas 101 and 102. A training sequence may be transmitted by the sources 91 and 92 in which the signals $s_1(t)$ and $s_2(t)$ are known, thus allowing for calibration of the weights of the spatial demultiplexer 103. The first antenna 101 receives the first signal 118 having a first magnitude 121 and the second signal 128 having a first magnitude 81. The second antenna 102 receives the first signal 118 at a second magnitude 122 and the second signal 128 at a second magnitude 82. The spatial demultiplexer 103 may direct the beam-shaping processes of the remote sources 91 and 92 to adjust the spatial gain distributions of the signals 118 and 128 at the array 100 in order to optimize reception. Reception quality may be measured as a signal-to-noise or a signal-to-noise-plus-interference relationship.

Communication between the spatial demultiplexer 103 and the remote sources 91 and 92 for optimizing reception may be accomplished by providing a feedback signal from the receiver 120 to the sources 91 and 92 that indicates the degree of reception quality. Shaping of the spatial gain distributions 118 and 128 transmitted by the sources 91 and 92 may be accomplished by aperture synthesis, beam steering, interferometric combining of multiple signals, microwave lensing, or the like.

Spatial multiplexing of communication signals and demultiplexing of those signals using known spatial gain distribution ratios of the received signals $s_1(t)$ and $s_2(t)$ has been shown with respect to RF communication signals. However, this method of canceling interference may also be applied to electromagnetic signals in other frequency domains, such as optical frequencies. Optical transmitters may include collimated sources, such as lasers.

In the case where the sources 91 and 92 have any angular separation, their direct and multipath components may have different directions of arrival. A microwave lens (not shown) may be used to enhance spatial gain characteristics of the received signals $s_1(t)$ and $s_2(t)$ that the lens directs to a plurality of receivers (not shown). A microwave lens (not shown) receives incident radiation and focuses it onto receivers (not shown) located in the focal plane of the lens (not shown). The position of each receiver (not shown) receives an amount of the focused radiation depending on the receiver position and the directions of arrival of incident radiation. The angular separation between directions of arrival $\theta_1$ and $\theta_2$ allows the lens (not shown) to adjust the spatial gain distributions $\beta_{mn}$ of the signals $s_1(t)$ and $s_2(t)$ received by the receivers (not shown). An effective spatial gain $\beta'_{mn}$ corresponding to the signals $s_1(t)$ and $s_2(t)$ at the receivers (not shown) is the products of the spatial gain distribution $\beta_{mn}$ of each transmit signal and a multiplicative lensing factor resulting from the focusing effect of the lens (not shown). The effective spatial gain $\beta'_{mn}$ may be determined by test sequences of known transmissions from the sources 91 and 92. Also, the spatial gain $\beta'_{mn}$ may be estimated from known spatial gain distributions $\beta_{mn}$ transmitted by the sources 91 and 92, known angular positions $\theta_1$ and $\theta_2$ of the sources 91 and 92, and a known gain profile applied by a lens (if any) to the receivers (not shown).

Figure 2:
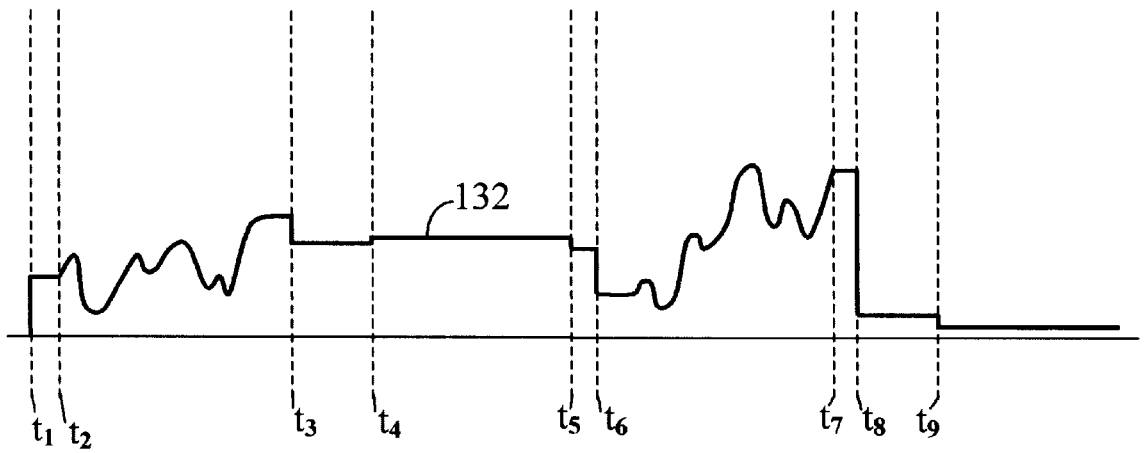
FIG. 2 is a graphic representation of the absolute value of the amplitude of a received signal plotted with respect to a time line.

FIG. 2 shows an absolute value of amplitude-versus-time profile 132 of a received signal $s_n(t) \beta_{mn}$ from an $m^{th}$ antenna element. In this case, $s_n(t)$ is a step function representing a data symbol that has a duration time $t_s$. The term $\beta_{mn}$ is a complex-valued time-dependent variation of signal amplitude caused by the temporally diverse arrivals of multipath components. Therefore, the time-dependent amplitude is written as $\beta_{mn}(t)$. Unlike $s_n(t)$, $\beta_{mn}(t)$ does not have a predetermined duration. The received signal $s_n(t)\beta_{mn}(t)$ is the sum of multipath components arriving at the $m^{th}$ antenna:

$$s_n(t)|\beta_{mn}(t)|\sin(\omega t + \phi_{mn}) = \sum_i |\beta_{mni}|s_n(t+t_i)\sin(\omega t + \phi_i)$$

where $\beta_{mni}$ is the complex-valued amplitude of each multipath component i, $t_i$ is the delay of the $i^{th}$ component, $\phi_i$ is the phase of $\beta_{mni}$, the sine term represents the carrier, and $\omega$ is the carrier frequency. The absolute value of the amplitude $\beta_{mn}(t)$ and the phase $\phi_{mn}$ are given by the following equations:

$$|\beta_{mn}(t)| = \sqrt{(A^{2(t)} + B^{2(t)})}$$

$$\phi_{mn} = \tan^{-1}\left(\frac{B}{A}\right)$$

where $$A(t) = \sum_i |\beta_{mni}|S(t)\cos(\phi_i)$$

$$B(t) = \sum_i |\beta_{mni}|S(t)\sin(\phi_i)$$

The term $S(t)$ is the time dependent step function in the signal $s_n(t)$.

Figure 3:
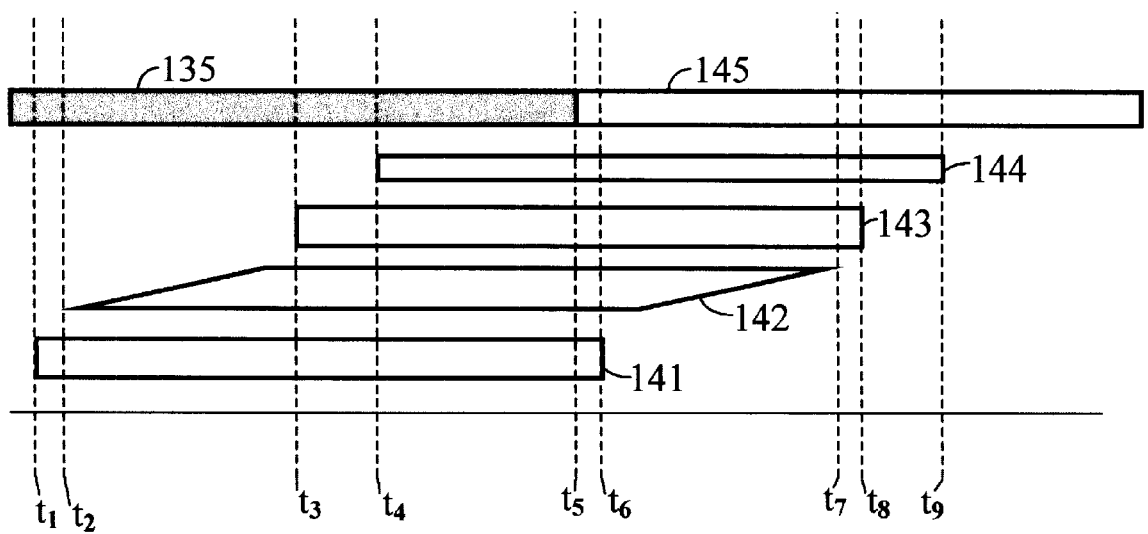
FIG. 3 is a graphic representation of the time of arrival and duration of received signal components.

FIG. 3 illustrates the arrival times and duration of several multipath components of a single transmitted bit $s_n(t)$. A line-of-sight signal 141 arrives at a time $t_1$, has a duration $t_s$, and ends at $t_6 = t_1 + t_s$. At $t_2$ (a short time after time $t_1$), the first multipath signals from a distributed scatterer begin arriving. Continuous multipath signals typically arrive shortly after the line-of-sight signal. Because the scatterer is distributed, the multipath contributions vary continuously over a period of time. This causes the amplitude 132 shown in FIG. 2 to undergo rapid changes, which result from an addition of continuously arriving signals having varying amplitudes and phases. At time $t_3$, a multipath signal from a discreet scatterer arrives at the antenna. The arrival of this signal at time $t_3$ is apparent from the sudden change in the amplitude 132 shown in FIG. 2 at $t_3$. Typically, multipath signals picked up at later times tend to be from discreet scatterers. The signal 143 has a duration equal to the bit length $t_s$ and ends at $t_8 = t_3 + t_s$. Another discreet multipath component 144 is received between times $t_4$ and $t_9$. However, the component 144 is assumed to have small magnitude or a particular phase offset, which results in component 144 not having much effect on the received amplitude 132. A signal component 145 that has a substantial delay $t_5$ arrives close to the end of the line-of-sight component (at $t_6$).

FIG. 2 shows the absolute-value amplitude profile 132 for a particular received data bit $s_n(t)$. The signal 135 arriving before signal 145 may include a previously sent data bit $s_n(t-t_s)$ if the guard interval between data bits is small. Likewise, bits (not shown) from the earlier data bit $s_n(t-t_s)$ precede the other signals 141, 142, 143, and 144. Intersymbol interference results from receiving one or more delayed bits at the same time the current bit is received.

FIG. 2 shows only the contributions from one transmitted data bit $s_n(t)$. The amplitude profile 132 appears relatively constant in the time interval $\Delta t = t_3$ to $t_5$. The effect of signal 144 on the amplitude profile 132 is considered negligible. Also, restricting measurement of the amplitude to this time interval $\Delta t$ prevents intersymbol interference from multipath components associated with signals 142, 143, and 144. Thus, weight and sum techniques should be performed from samples taken inside of the time interval $\Delta t$.

Figure 4:
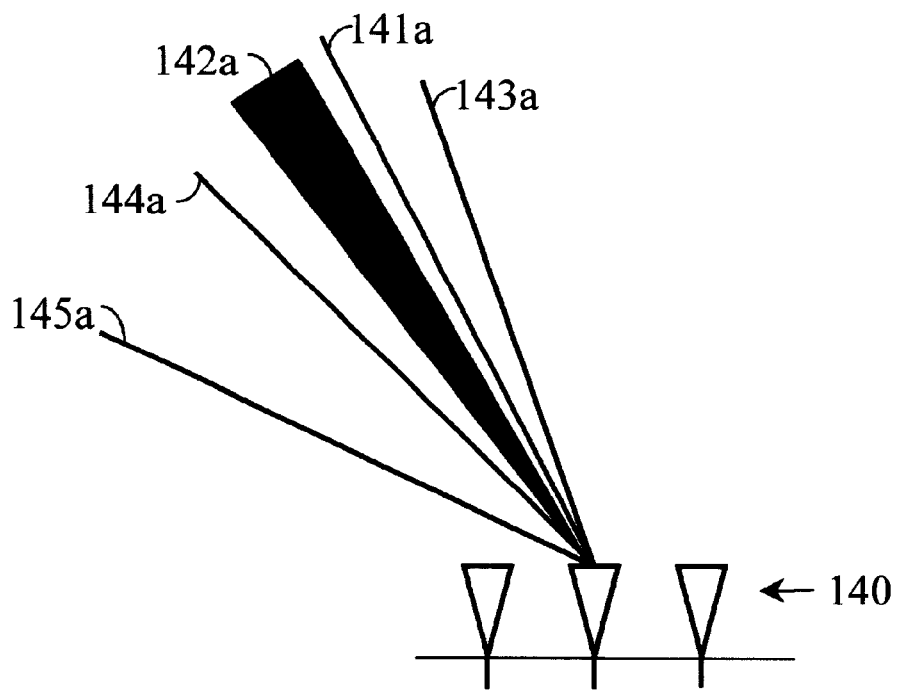
FIG. 4 is a graphic representation of angles of arrival for different multipath components of a received signal.

Time diversity indicates spatial diversity. Thus, it is typical for signals having different delays to arrive from different directions. FIG. 4 illustrates different directions of arrival 141a, 142a, 143a, 144a, and 145a for each of the signal components shown in FIG. 3; 141, 142, 143, 144, and 145, respectively.

Figure 5:
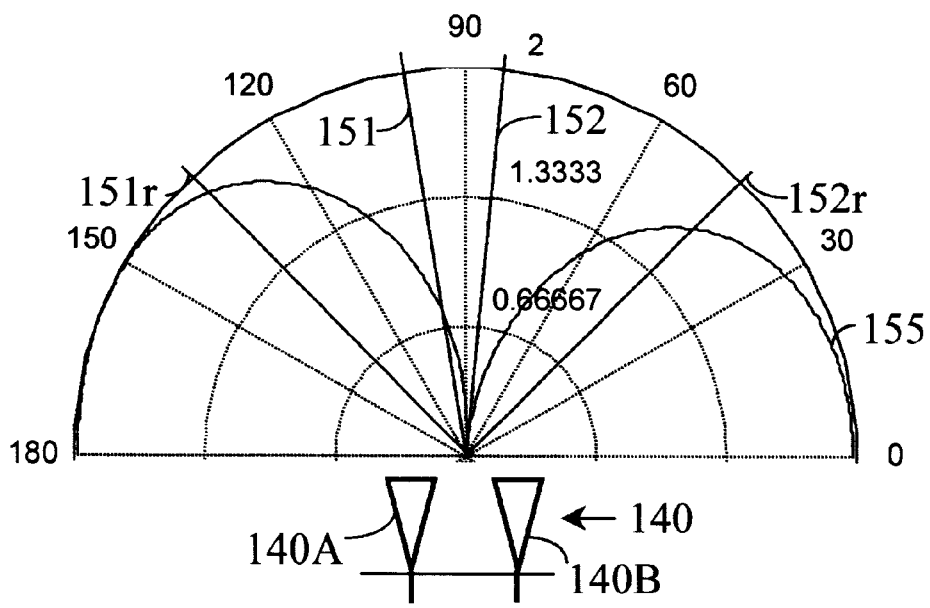
FIG. 5 is a plot of a beam pattern generated by a two-element prior-art antenna array.

FIG. 5 is a plot of a beam pattern 155 produced by a prior-art beamforming technique applied to a two-element array 140. In this example, a beam-pattern null is created in the direction 152 of a strong interfering source. A multipath component of the signal transmitted by a remote transmitter source provides another source of interference from a different direction 152r. Similarly, two signal paths from different directions 151 and 151r arrive from a desired transmitter.

The beam pattern 155 provides a null in the direction 152 of one of the sources of interference. However, the beam-pattern magnitude in the direction 152r of the other interference source is close to its maximum. To provide a simple comparison between beamforming and cancellation, the following values are used in a numerical analysis: A first transmit signal $s_1(t)$ is received from direction 151 with a magnitude of 1.0 and received from direction 151r with a magnitude of 0.5. A second transmit signal $s_2(t)$ is received from directions 152 and 152r with magnitudes of 1.0 and 0.5, respectively. A noise power of $n_o$ is picked up by both antennas 140A and 140B of the array 140. The azimuthal angles of each direction 152r, 152, 151, and 151r are 45, 85, 100, and 135 degrees, respectively. The antennas 140A and 140B are separated by a distance of half the carrier signal's wavelength. The antennas 140A and 140B are assumed to each have a uniform omnidirectional beam pattern.

In the beamforming method, the desired signal $s_1(t)$ received by the array 140 has a magnitude of 1.5399. The contribution of interference from signal $s_2(t)$ is 0.9825. The receiver noise is $2n_0$. In one version of the cancellation method, antennas 140A and 140B receive signals $R_1$ and $R_2$, respectively, where: $R_1 = 1.5s_1(t) + 0.6417s_2(t)$ and $R2 = 1.5s_1(t) + +0.7029s_2(t)$. A simplifying assumption has been made in this example. Signals $s_1(t)$ and $s_2(t)$ are assumed to arrive in phase at both antennas 140A and 140B, which simplifies the complex-valued spatial gains $\beta_{mn}$ to real values. In reality, complex spatial gains $\beta_{mn}$ should be expected. The receive signals $R_1$ and $R_2$ are weighted to separate $s_1(t)$ and $S_2(t)$:

$$S_{1est} = R_1 - \left(\frac{.6417}{1.5}\right)R_2$$

$$S_{2est} = R_2 - \left(\frac{.7029}{1.5}\right)R_1$$

In $S_{1est}$, the desired signal $s_1(t)$ has a magnitude of 1.0489, the interference signal $s_2(t)$ has a magnitude of 0., and the receiver noise is $1.4278n_0$. Thus, depending on the magnitude of $n_O$ relative to the magnitude of the interference $s_2(t)$, the weights may be adjusted to maximize the signal-to-interference ratio for the desired signal $s_1(t)$. The term "interference" in "signal-to-interference" includes receiver noise. The term "interference" is meant to convey any kind of signal degradation, such as, but not limited to, interference caused by other desired transmit signals, sources of undesired interference and noise, receiver noise, distortion, and intersymbol interference.

Due to the large number of multipath signals that may arrive at an antenna array, beamforming by itself is an impractical solution. The large number of multipath signals (and the angular spread of continuous multipath signals) would require an array with a large number of array elements to compensate for a small number of interfering transmit sources. Large arrays typically present problems, such as the additional complexity of an increased number of signal-processing systems to control the array. The size of an antenna system significantly limits the applications in which the system can be used. For example, an array that has many elements would not be practical for most mobile applications unless the frequency of operation enabled the array to be small.

Typically, multipath signals that have a long delay were scattered by discreet sources. Therefore, long multipath signals causing intersymbol interference usually arrive from a discreet direction. The number of these signals is usually much smaller than the number of short multipath signals. Thus, beamforming is a viable method for nulling in the direction from which long multipath signals are received. Nulling sources of intersymbol interference allows faster data rates. If the nulling process has enough degrees of freedom to provide a plurality of different beam patterns, the outputs from these beam patterns can be weighted and summed by a spatial demultiplexer to provide improved multipath processing benefits of SIM.

Figure 6:
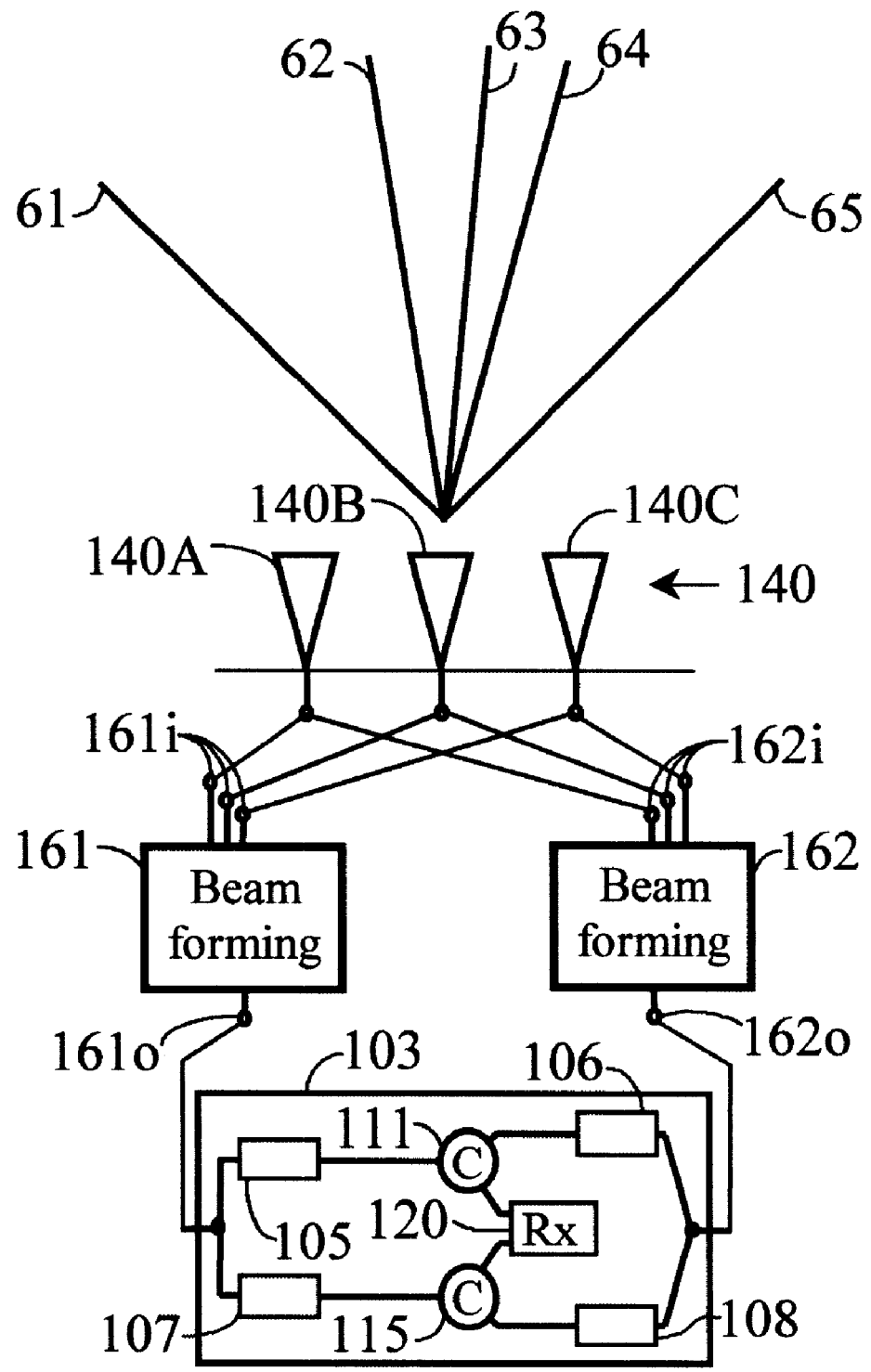
FIG. 6 illustrates a cancellation system of the present invention used with a prior-art antenna array.

FIG. 6 shows a process for nulling intersymbol interference and applying a cancellation method to reduce co-channel interference. An antenna array 140 is responsive to signals that are shown arriving from five different directions 61, 62, 63, 64, and 65. Desired multipath components of a first signal $s_1(t)$ arrive from at least two different directions 62 and 64. Desired multipath components of a second signal $s_2(t)$ also arrive from at least two different directions 63 and 65. A very long multipath component of signal $s_1(t)$ or $s_2(t)$ arrives from direction 61 and, if received by the array 140, will cause intersymbol interference.

Figure 7A:
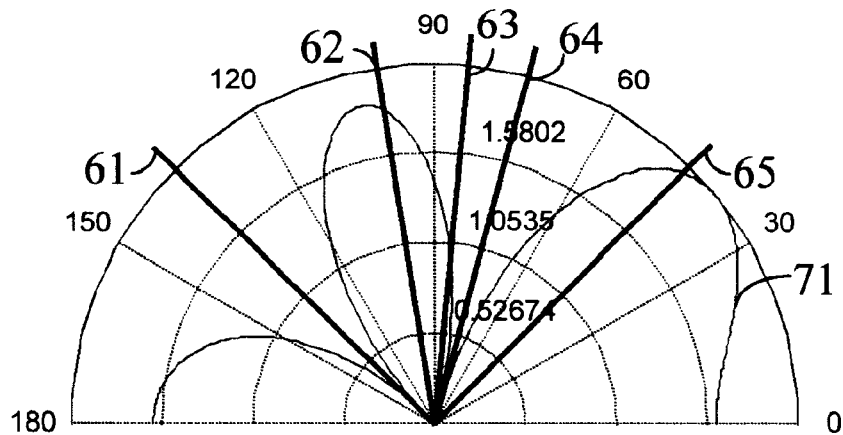
FIG. 7A is a plot of a first beam pattern produced by a three-element array.
Figure 7B:
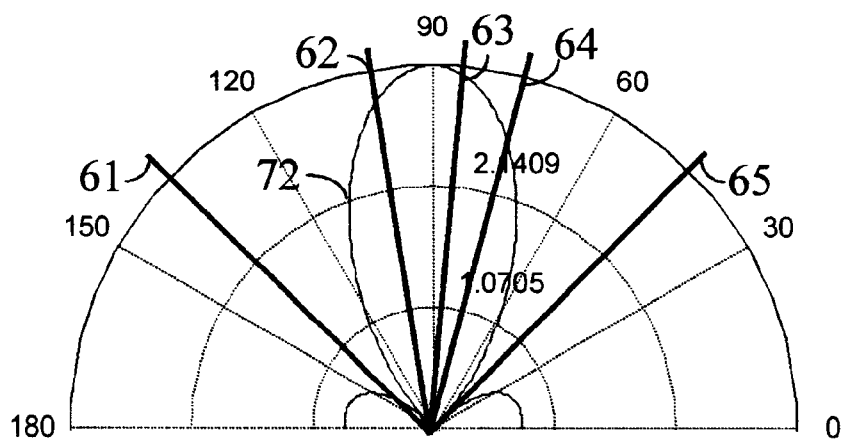
FIG. 7B is a plot of a second beam pattern produced by a three-element array.

FIG. 6 shows three spatially diverse antennas 140A, 140B, and 140C in the antenna array 140. Signals received by each of the antennas 140A, 140B, and 140C are input to beamforming processors 161 and 162. In beamforming, the carrier signals modulated by signals $s_1(t)$ and $s_2(t)$ are not removed before processing. When the multipath components have different angles of arrival, varying degrees of constructive and destructive interference of the multipath components occur at different locations. If multipath components of the signals $s_1(t)$ and $s_2(t)$ have different angles of arrival, then each of the signals $s_1(t)$ and $s_2(t)$ has a different spatial gain distribution at the array 140. The beamforming processors 161 and 162 use the phase differences of received signals between the antennas 140A, 140B, and 140C that result from the different angles of arrival to separate the signals. The beamforming processors 161 and 162 apply complex weights to each of the antenna outputs such that the interfering signal from direction 61 is nulled. The first processor 161 places a second null in a second direction, such as direction 64 as shown in FIG. 7A. The second processor 162 places a second null in a different direction, such as direction 65 shown in FIG. 7B. An antenna beam pattern 71 produced by the first processor 161 is shown in FIG. 7A. FIG. 7B shows a plot of a beam pattern 72 produced by the second processor 162. The different placement of the nulls by the processors 161 and 162 results in differently shaped beam patterns 71 and 72. Differently shaped beam patterns are a requirement for a cancellation process to provide signal separation in this particular case. Thus, beam shaping by the receiving antenna 140 is shown to be an essential factor in the effective spatial gain distribution of the signals $s_1(t)$ and $s_2(t)$ at the outputs 161o and 162o of the processors 161 and 162. Common methods of beam shaping and demultiplexing are described in U.S. Pat. No. 5,515,378, which is incorporated herein for reference. The processors 161 and 162 may either remove the carrier from each received signal or leave the carrier intact.

The output signals from the processors 161 and 162 each have different proportions of the signals $s_1(t)$ and $s_2(t)$:

$$S_{1o} = \beta_{11}s_1(t) + \beta_{12}s_2(t)$$
$$S_{2o} = \beta_{21}s_1(t) + \beta_{22}s_2(t)$$

The condition $\beta_{11}\beta_{22} \neq \beta_{12}\beta_{21}$ is required to separate the signals $s_1(t)$ and $s_2(t)$. The output signals $S_{1o}$ and $S_{2o}$ are input to the spatial demultiplexer 103. The spatial demultiplexer 103 illustrates the process of weighting and combining interfering signals $s_1(t)$ and $s_2(t)$ to cancel interference and separate desired receive signals $s_1(t)$ and $s_2(t)$ from each other. The input signals $S_{1o}$ and $S_{2o}$ have a first set of weights (105 and 106, respectively) applied to them and are then combined in a summing (or difference) process 111 to separate out an estimated value of the signal $s_1(t)$. Similarly, the input signals $S_{1o}$ and $S_{2o}$ have a second set of weights (107 and 108, respectively) applied to them and are then combined 115 to separate out an estimated value of the signal $s_2(t)$. The weights 105, 106, 107, and 108 may have complex values that provide delays or phase shifts as necessary to ensure that interference signals cancel in the summing process 111 and 115. The estimated values of $s_1(t)$ and $s_2(t)$ are input to a decision processor 120 that optimizes reception of the desired signals $s_1(t)$ and $s_2(t)$. The decision processor 120 may provide adjustment to the weight processes 105, 106, 107, and 108, the beamforming processors 161 and 162, or remote transmitters (not shown) that transmit the signals $s_1(t)$ and $s_2(t)$.

The decision processor 120 may provide remote transmitters (not shown) with control information to adjust beam shaping, directivity, or the location of transmitters to optimize the spatial gain distribution of signals received by the array 140. Multipath components, as shown in FIG. 4, arrive from different directions and have different amplitudes. Adjustments made to the transmitting antenna (not shown) that affect the amplitude and/or direction of arrival of the multipath components change the spatial gain distribution of transmitted signals $s_1(t)$ and $s_2(t)$ received at the antenna 140. A preferred embodiment of the transmitting antenna (not shown) is an antenna array (like the array 140) that is operated in a beamforming mode such that the directionality of the array can be controlled and the long multipath components at the receive end can be suppressed.

Beamforming at a transmitter array (not shown) is an interferometric combining of transmit signals from a plurality of spatially separate antennas. The interferometric combining results in different signal amplitudes being transmitted in different directions (and hence along different paths to the receive antenna 140). Spatially separated transmit elements may be controlled such that the amplitude and phase of each signal is selected to provide a specific superposition of the signals (thus, spatial gain distributions) at the receive antenna 140 to optimize reception.

The spatial interferometry demultiplexing technique shown in FIG. 6 is one example of the many different ways spatial gain characteristics of received signals can be adjusted and enhanced at a receiver. A plurality of sub-arrays (not shown) may be used to generate signal inputs $S_{1o}$ and $S_{2o}$ to the spatial demultiplexer 103. The locations of the sub-arrays (not shown) with respect to each other, and/or the different beam patterns of each sub-array (not shown) may be used to adjust the effective spatial gain distributions of desired and interfering signals in the signal inputs $S_{1o}$ and $S_{2o}$. Similarly, a lens (such as a Rotman lens) may be used to focus electromagnetic signals arriving from different directions onto spatially separated areas of a back plane (not shown). Detectors (not shown) on the back plane (not shown) may pick up spatially overlapping received signals, which are provided with a spatial gain distribution by the lens (not shown).

The examples illustrated by FIG. 1 and FIG. 6 show simplified systems that separate signals from only two transmit sources 91 and 92. Practical applications of SIM can involve separating more than two components. For example, a more sophisticated version of the spatial demultiplexer 103 may be used to handle signal inputs from additional antennas shown in FIG. 1. Also, a more sophisticated version of the demultiplexer shown in FIG. 6 may be used to handle signal inputs from an increased number of beamforming processors, such as processors 161 and 162. It is important to note that array 140 does not require a larger number of antenna elements to separate an increased number N of received signals $s_3(t)$. Rather, the number of beamforming processors generating different receiver beam patterns determines the number N of signals $s_n(t)$ that can be separated.

FIG. 9 illustrates the operation of a three-input spatial demultiplexer 206. Three inputs 201, 202, and 203 receive signals $y_1(t)$, $y_2(t)$, and $y_3(t)$ that have transmit components $s_1(t)$, $s_2(t)$, and $s_3(t)$ from a diverse receiver system 156 shown in FIG. 10B.

$$y_1(t) = \beta_{11}s_1(t) + \beta_{12}s_2(t) + \beta_{13}s_3(t) + n_1$$
$$y_2(t) = \beta_{21}s_1(t) + \beta_{22}s_2(t) + \beta_{23}s_3(t) + n_2$$
$$y_3(t) = \beta_{31}s_1(t) + \beta_{32}s_2(t) + \beta_{33}s_3(t) + n_3$$

where $n_1$, $n_2$, and $n_3$ are noise signals.

The proportions of the spatial gains $\beta_{mn}$ of the components $s_n(t)$ must differ such that the equations for $y_m(t)$ are unique for all m. For m=1,2,3, this will provide three equations with three unknowns. Each solution of the three equations provides an estimate of one of the signal components $s_1(t)$, $s_2(t)$, and $s_3(t)$ at an output 251, 252, and 253.

Each input signal $y_m(t)$ is sampled twice or split into two samples. One of the $y_1(t)$ samples goes through a first weighting process 211 where the signal remains unchanged. The weighting processes are illustrated as amplifiers to indicate that a buffering process occurs when signals are weighted Signals added to the output of a buffer do not affect the value of signals input to the buffer. The signal $y_1(t)$ is then combined with a weighted version of component $y_2(t)$ that receives a weight of $-g_{12}$ from a weighting element 213. The signals $y_1(t)$ and $-g_{12}y_2(t)$ are summed to produce signal $y_{12}(t)$. The second sample of $y_1(t)$ goes through a second weighting process 212 where it is changed by gain $-g_{31}$. This weighted signal is combined with an unweighted version of signal $y_3(t)$ that is processed with unity gain 215 to produce signal $y_{31}(t)$. An unweighted version of signal $y_2(t)$ is output after a unity gain buffer 214 and is combined with a weighted version of signal $y_3(t)$ to produce signal $y_{23}(t)$. The signal $y_3(t)$ receives a weight of $-g_{23}$ from a weighting process 216.

An unweighted version of signal $y_{12}(t)$ passes through a buffering process 231 and is combined with a $-g_{41}$ weighted version of signal $y_{31}(t)$ that is acted on by a weighting process 232. The resulting signal is $y_{41}(t)$. A second version of signal $y_{12}(t)$ acquires a weight of $-g_{42}$ in a weighting process 233 before being combined with signal $y_{23}(t)$, which passes through a buffering process 234. This produces signal $y_{42}(t)$ Signal $y_{42}(t)$ passes through a buffering process 244 and is combined with a weighted version of $y_{31}(t)$ to provide an estimated signal $s'_2(t)$ at the output 252. The signal $y_{31}(t)$ has a weight of $-g_{52}$ applied by a weighting process 243. An estimated signal $s'_1(t)$ at output 251 results from the summation of signal $y_{41}(t)$ with a version of signal $y_{23}(t)$, which has a weight of $-g_{51}$ applied by a weighting process 242. The signal $y_{41}(t)$ is unchanged as it passes through a buffering process 241. The combining of unweighted signal $y_{31}(t)$ with a weighted signal $y_{42}(t)$ produces an estimated signal $s'_3(t)$ at output 253. The unweighted signal $y_{31}(t)$ is buffered by a process 246, and signal $y_{42}(t)$ is multiplied by a weight value of $-g_{53}$ during a weighting process 245.

The estimated signal values are given by the following equations:

$$s'_1(t) = (\beta_{11} - \beta_{21}g_{12} - (\beta_{31} - g_{31}\beta_{11})g_{41} - (\beta_{21} - \beta_{31}g_{23})g_{51})s_1(t) +$$
$$(\beta_{12} - \beta_{22}g_{12} - (\beta_{32} - g_{31}\beta_{12})g_{41} - (\beta_{22} - \beta_{32}g_{23})g_{51})s_2(t) +$$
$$(\beta_{13} - \beta_{23}g_{12} - (\beta_{33} - g_{31}\beta_{13})g_{41} - (\beta_{23} - \beta_{33}g_{23})g_{51})s_3(t)$$

$$s'_2(t) = ((\beta_{21} - g_{31}\beta_{31}) - (\beta_{11} - \beta_{21}g_{12})g_{42} - (\beta_{31} - \beta_{11}g_{31})g_{52})s_1(t) +$$
$$((\beta_{22} - g_{31}\beta_{32}) - (\beta_{12} - \beta_{22}g_{12})g_{42} - (\beta_{32} - \beta_{12}g_{31})g_{52})s_2(t) +$$
$$((\beta_{23} - g_{31}\beta_{33}) - (\beta_{13} - \beta_{23}g_{12})g_{42} - (\beta_{33} - \beta_{13}g_{31})g_{52})s_3(t)$$

$$s'_3(t) = (\beta_{31} - \beta_{11}g_{31} - ((\beta_{21} - g_{23}\beta_{31}) - (\beta_{21} - \beta_{31}g_{23})g_{42})g_{53})s_1(t) +$$
$$(\beta_{32} - \beta_{12}g_{31} - ((\beta_{22} - g_{23}\beta_{32}) - (\beta_{22} - \beta_{32}g_{23})g_{42})g_{53})s_2(t) +$$
$$(\beta_{33} - \beta_{13}g_{31} - ((\beta_{23} - g_{23}\beta_{33}) - (\beta_{23} - \beta_{33}g_{23})g_{42})g_{53})s_3(t)$$

If the weights $g_{ij}$ are selected to completely cancel interfering signals, the interference components $s_p(t)$ (where $p \neq k$) of each estimated signal $s'_k(t)$ are zero. In this case, all weights $g_{ij}$ are functions of gains $\beta_{mn}$. In order to minimize the sum of interference and noise contributions to the estimated signals $s'_k(t)$, it is desirable to adjust the weights $g_{ij}$ used in the spatial demultiplexer 206. Thus, a small amount of interference may be added to the signals $s'_k(t)$ in order to reduce the total noise plus interference.

Assuming that noise levels for each input signal $y_m(t)$ are the same (and defined as $n_o$), corresponding values of noise nk in the estimated signals $s'_k(t)$ are related to the absolute values of the weights used in the spatial demultiplexer 206. This is shown by the following equations:

$$n_1 = ((1+|g_{12}|) + (1+|g_{31}|)|g_{41}| + (1+|g_{12}|)|g_{51}|)n_o$$
$$n_2 = ((1+|g_{23}|) + (1+|g_{12}|)|g_{42}| + (1+|g_{31}|)|g_{52}|)n_o$$
$$n_3 = ((1+|g_{31}|) + ((1+|g_{23}|) + (1+|g_{12}|)|g_{42}|)|g_{53}|)n_o$$

A training sequence may be used to establish the values of the weights $g_{ij}$. A training sequence involves sending known reference signals such that the spatial gain characteristics of each received signal can be determined. This may be accomplished by sending a reference signal at a predetermined time or after interrogation or by sending a reference signal on a different communication channel (such as a frequency channel or a CDMA code channel). The rate of change of the spatial gain characteristics may be determined from the reference signals and then used to adapt the weights to compensate for predicted changes in the spatial gain characteristics. The weights may also be determined by estimation methods in addition to or in place of reference signals. For example, the constant modulus property of various communication signals, such as digital phase-shift-keyed and analog FM waveforms, can be exploited along with the properties of the array to simultaneously estimate the source waveforms as well as their directions of arrival.

Other cancellation methods may be used in addition to or in place of the method described. One such method involves taking the inverse of the matrix $\beta_{mn}$ that describes the spatial gain distributions of the received signals $y_m(t)$ and then applying the inverse to the received signals $y_m(t)$. Another technique for diagonalizing the matrix $\beta_{mn}$ is known as Cramer's method. These techniques, as well as others, may be used together. Different cancellation methods often provide the best signal reception for different received spatial gain distributions.

FIG. 10B shows a spatial demultiplexer 206 connected to a diversity receiver 156. The receiver 156 receives transmitted electromagnetic signals from a plurality of remote transmitters 99 shown in FIG. 10A. The spatial gains $\beta_{mn}$ of transmitted signals $s_n(t)$ at the receiver 156 allow the receiver to generate a number n of received signals $y_m(t)$ that are unique functions of $s_n(t)$. The receiver has at least a number k of outputs 151, 152, and 153 (where k is the number of desired signals) connected to the inputs 201, 202, and 203 of the spatial demultiplexer 206.

Figure 11A:
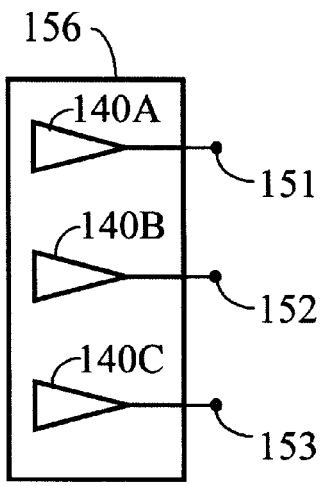
FIG. 11A shows a spatially diverse receiver.
Figure 11B:
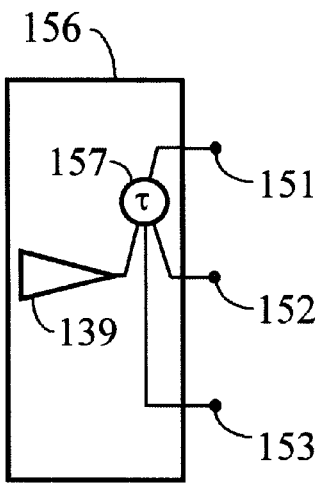
FIG. 11B shows a temporally diverse receiver.

The diversity receiver 156 shown in FIG. 10B may be one of many different types of diversity receivers. In FIG. 11A, the diversity receiver 156 has an array of spatially separated antennas 140A, 140B, and 140C for providing spatially diverse signals $y_m(t)$ to the spatial demultiplexer 206. The diversity receiver 156 shown in FIG. 11B provides temporally diverse signals $y_m(t)$ to the demultiplexer 206. The temporal nature of the amplitude of a total signal comprised of multipath components is shown in FIG. 2. In this case, the spatial gain characteristics of the transmitted signals $s_n(t)$ received at the antenna 140 change with time as different multipath components are received. A time sampler 157 samples an antenna's 139 response at different time intervals to generate temporally diverse signals $y_m(t)$ to the spatial demultiplexer 206.

Figure 11C:
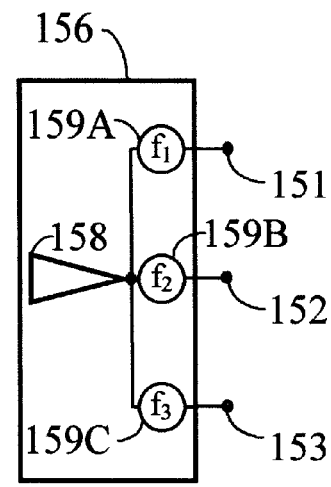
FIG. 11C shows a frequency-diverse receiver.

Frequency diversity, as well as time diversity, can be used to compensate for multipath fading. The present invention also uses frequency diversity in place of spatial diversity to separate received signals in a fading environment. Thus, only a single antenna element is necessary for spatial demultiplexing a large number of signals $s_n(t)$. The receiver 156 shown in FIG. 11C provides frequency diverse signals $y_m(t)$ to a spatial demultiplexer. Received signals $s_n(t)$ having at least three (in the example shown in FIG. 11C) different frequency components are separated by a filter apparatus 159A, 159B, and 159C into separate frequency components $y_m(t)$, which are output to a spatial demultiplexer 206. The filter apparatus 159A, 159B, and 159C may be a classical filter or any type of apparatus that provides the frequency separation or detection of different frequency components.

A method for enhancing the process of SIM includes setting the data rate(s) of the transmitted signals $s_n(t)$ between two boundaries. An upper boundary limits the amount of intersymbol interference (from directions that are not nulled). A lower boundary defines a rate in which the channel (hence, the spatial gain characteristics of the received signals $s_n(t)$) changes significantly. Thus, a multicarrier transmission protocol is recommended.

Multicarrier protocols include, but are not limited to, Orthogonal Frequency Division Multiplexing, Multi-Carrier CDMA, and Carrier Interferometry Multiple Access (CIMA). Multicarrier protocols transmit relatively slow data rates over each of a plurality of carriers to achieve a high data rate and provide superior performance compared to other spread-spectrum techniques (such as CDMA). In Multicarrier, each transmission channel $s_n(t)$ is a group of frequency-diverse carrier signals. Transmission and reception are simplified because multicarrier protocols require a slow parallel type of processing rather than a fast serial type. Multicarrier protocols transmit large amounts of data over the sum of transmission channels $s_n(t)$. However, the relatively slow data rate per carrier reduces intersymbol interference and increases detection time. These benefits are also conducive to the operation of a spatial interferometry system.

Figure 12:
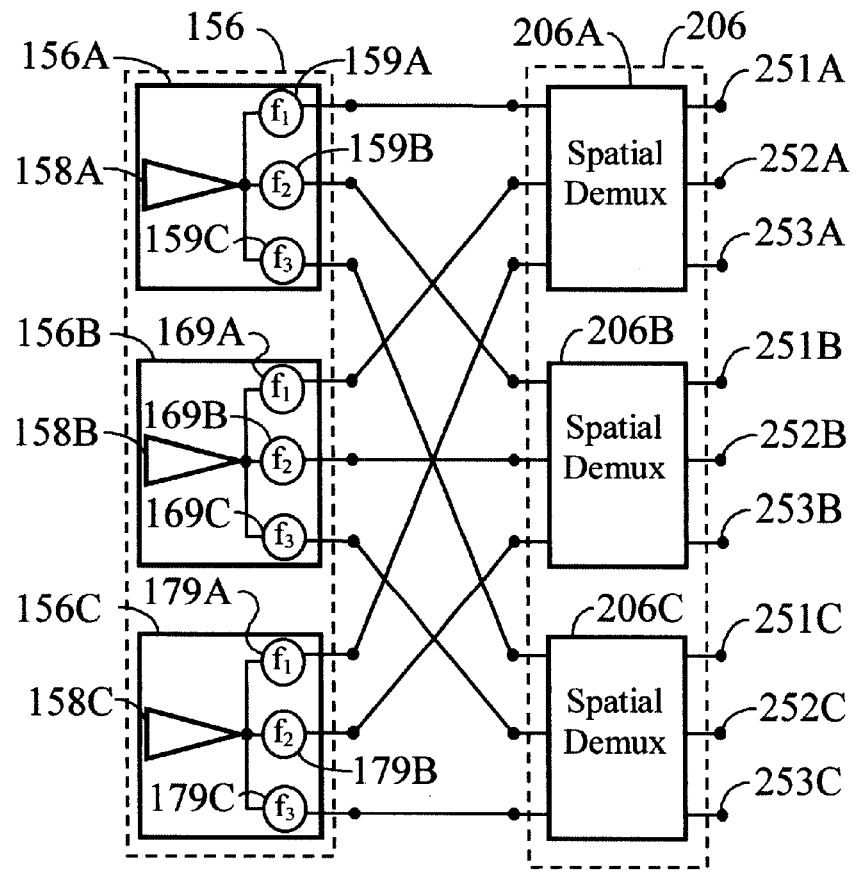
FIG. 12 shows a diversity receiver and spatial demultiplexer of the present invention designed to receive and process multicarrier signals.

FIG. 12 shows a receiver 156 and spatial demultiplexer 206 that separately process each carrier in a received multicarrier signal. The receiver 156 has a number of frequency-diverse sub-receiver systems 156A, 156B, and 156C. Each of the sub-receivers 156A, 156B, and 156C has one antenna 158A, 158B, and 158C, respectively. Antenna 158A is coupled to a first plurality of frequency-domain filters 159A, 159B, and 159C. Antenna 158B is coupled to a second plurality of frequency-domain filters 169A, 169B, and 169C. Antenna 158C is coupled to a third plurality of frequency-domain filters 179A, 179B, and 179C. The frequency-domain filters are any type of device or method that separates a signal with a particular frequency or frequency range from other signals with different frequencies.

In this example, the received signals are multicarrier signals that have three carrier-signal components with different frequencies $f_1$, $f_2$, and $f_3$. A spatial demultiplexer 206 includes a plurality of separate spatial demultiplexer units 206A, 206B, and 206C connected to the sub-receivers 156A, 156B, and 156C such that each unit processes signals with different frequencies $f_1$, $f_2$, and $f_3$. In the preferred embodiment shown in FIG. 12, the number of spatial demultiplexer units (such as units 206A, 206B, and 206C) is equal to the number of different carrier frequencies in the received multicarrier signals. As the number of carriers is increased, the number of demultiplexers is increased.

In the preferred embodiment shown in FIG. 12, each signal component received by each sub-receiver 156A, 156B, and 156C is weighted and summed (or otherwise enacted upon) by one of the spatial demultiplexer units 206A, 206B, and 206C in accordance with the frequency of the received component. Thus, the spatial demultiplexer 206A demultiplexes signals received by the receiver units 206A, 206B, and 206C that have frequency $f_1$. Similarly, the spatial demultiplexer 206B demultiplexes signals that have frequency $f_2$, and the spatial demultiplexer 206C demultiplexes signals that have frequency $f_3$. Each of the spatial demultiplexers 206A, 206B, and 206C has a number of inputs equal to the number of sub-receivers 156A, 156B, and 156C and a number of outputs equal to (or greater than) the number of desired signals. An obvious permutation of this embodiment is to use the spatial demultiplexer to simply remove undesired signals from desired signals. In this case, the number of outputs for each spatial demultiplexer unit 206A, 206B, and 206C is less than the number of inputs to each spatial demultiplexer unit 206A, 206B, and 206C.

Figure 13:
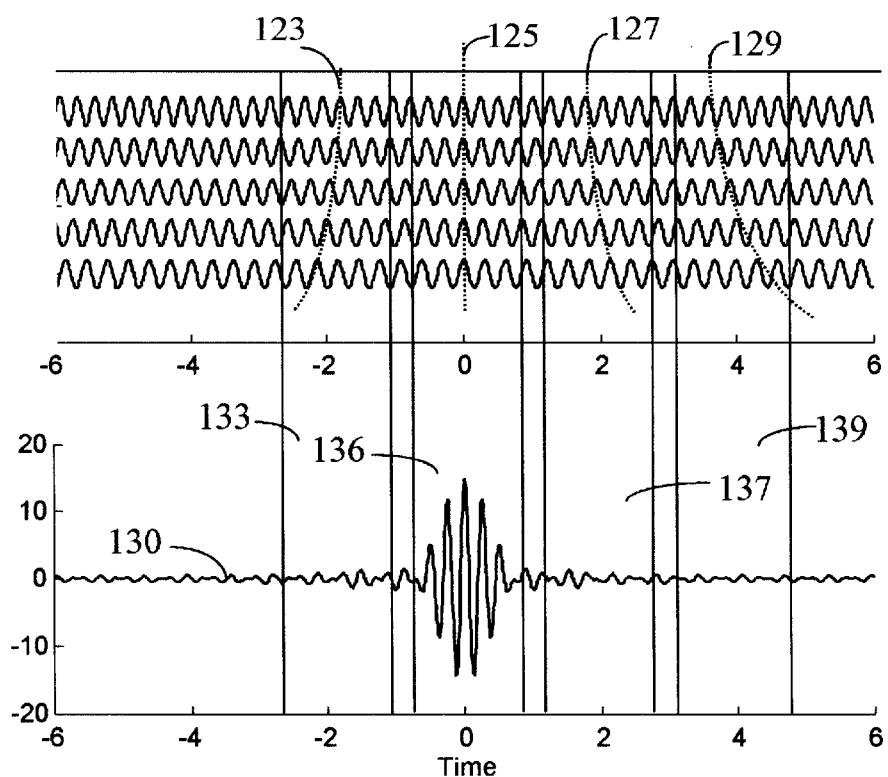
FIG. 13 illustrates how a plurality of carrier signals combine to produce a CIMA signal.

CIMA is a preferred multicarrier protocol for use in SIM. An explanation of CIMA is provided by U.S. patent application Ser. No. 09/022,950 and International Application No. PCT/US99/02838 which are incorporated by reference herein. In CIMA, multiple carriers are encoded with the same data bit. This redundancy provides frequency diversity and ensures that data arrives at a desired receiver without undergoing noticeable degradation from multipath fading or interference. Unlike other systems, frequency redundancy does not result in decreased bandwidth efficiency. Rather, the frequency separation and phase of a plurality of carriers are selected to provide a superposition spike 136 in the time domain (shown in FIG. 13). The performance and flexibility of CIMA protocols exceeds that of other multicarrier protocols as described in Nassar, et al, "Introduction of Carrier Interference to Spread Spectrum Multiple Access." Furthermore, variations of CIMA may be used to improve other protocols, such as CDMA and Frequency Hop Spread Spectrum.

In U.S. patent application Ser. No. 09/022,950 and International Application No. PCT/US99/02838, the interoperability of CIMA with antenna arrays is discussed. This is an important consideration because spatial processing offers tremendous capacity gains whereas conventional spread-spectrum protocols, such as CDMA, have compatibility problems with adaptive arrays. CIMA is not only compatible with arrays, it offers substantial improvements to array processing and provides new capabilities to array technology.

Figure 14:
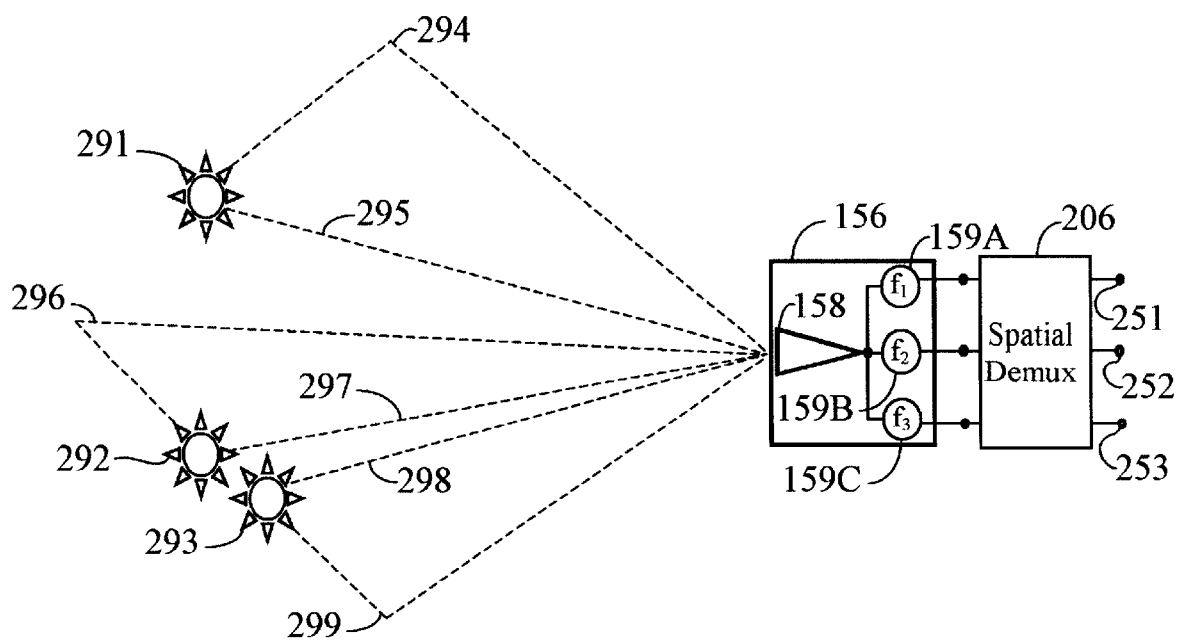
FIG. 14 shows the use of a frequency-diverse receiver coupled to a single antenna for spatially demultiplexing redundant multicarrier signals.

In mobile communication systems, antenna arrays are regarded as impractical for hand-held and mobile units because of the additional size of an array. Thus, the location of arrays are typically limited to base stations. CIMA allows spatial processing of received signals without requiring the use of an antenna array. FIG. 14 shows a frequency diversity receiver 156 coupled to a three-channel spatial demultiplexer 206. In a multipath-fading environment, a single antenna 158 receives spatial gain differences between different carriers. In the example shown, at least three carrier signals have frequencies $f_1$, $f_2$, and $f_3$. The carrier signals are received from three different transmit sources 291, 292, and 293, which modulate transmit signals $s_1(t)$, $s_2(t)$, and $s_3(t)$, respectively, onto all of the carriers. The signals transmitted by each of the transmitters 291, 292, and 293 arrive at the antenna 158 from more than one path, such as paths 294, 295, 296, 297, 298, and 299. Constructive and destructive combining of each carrier from each transmitter 291, 292, and 293 occurs depending on the frequency of the carrier and the phase offset and amplitude of each multipath component. Each transmitter 291, 292, and 293 transmits a specific information signal $s_n(t)$ (relative to each transmitter) over all of the carriers. Each information signal $s_n(t)$ received at the antenna 158 has a different complex-valued amplitude for each of the carriers. This inequality provides the means to recover desired signals from interfering signals. This inequality also enables the reception of transmitted signals $s_n(t)$ without the signal degradation that occurs in a fading environment.

The frequency-diversity receiver 156 includes three frequency filters 159A, 159B, and 159C that separate carrier signals by frequency. In this case, the transmit signals $s_n(t)$ are removed from the carriers by the receiver 156 before processing by the spatial demultiplexer 206. An output signal $y_m(f_m, t)$ from each of the frequency filters 159A, 159B, and 159C contains different proportions $\beta_{mn}$ of the transmit signals $s_n(t)$:

$$y_1(f_1, t) = \beta_{11}s_1(t) + \beta_{12}s_2(t) + \beta_{13}s_3(t) + n_1$$

$$y_2(f_2, t) = \beta_{21}s_1(t) + \beta_{22}s_2(t) + \beta_{23}s_3(t) + n_2$$

$$y_3(f_3, t) = \beta_{31}s_1(t) + \beta_{32}s_2(t) + \beta_{33}s_3(t) + n_3$$

Estimates of each transmit signal $s_n(t)$ are output after the spatial demultiplexing process 206 at output terminals 251, 252, and 253. In this case (as in the examples shown previously), a single desired signal may be separated and the other signals discarded. For example, transmit source 291 may be a base station and the other transmitters 292 and 293 may be interfering mobile units. This results in simplification of the processes performed by the spatial demultiplexer 206.

Weights applied by the spatial demultiplexer 206 depend on the spatial gain values $\beta_{mn}$ of the transmit signals $s_n(t)$. The gain values $\beta_{mn}$ may be determined from a training sequence in which each transmitter 291, 291, and 293 transmits a known signal.

An alternative preferred embodiment of the CIMA receiver is a dual-mode processing system that operates in both rich and marginal multipath environments and that attains optimized reception in both environments. This embodiment includes a simple combining system (such as one of those described in U.S. patent application Ser. No. 09/022,950, International Application No. PCT/US99/02838, and Introduction of Carrier Interference to Spread Spectrum Multiple Access, 1999 Emerging Technologies Symposium on Wireless Communications, Apr. 12–13, 1999) coupled to the receiver 156 outputs for time demultiplexing received CIMA signals. This simple combining system processes CIMA signals $s_n(t)$ that are not significantly affected by multipath fading.

Figure 15:
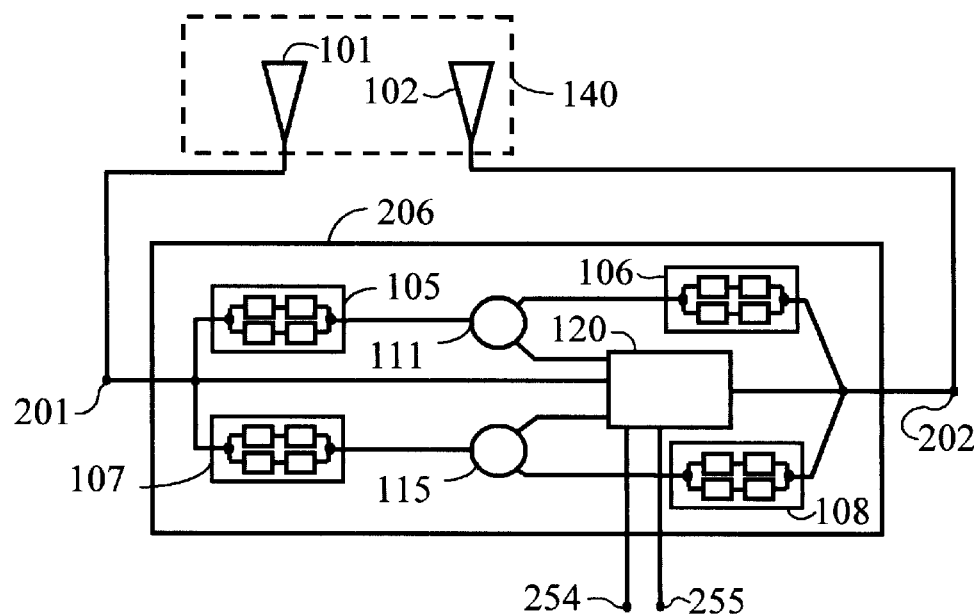
FIG. 15 shows a decision processor coupled to a diversity receiver.

FIG. 15 shows an improved spatial demultiplexer 206 in which the decision processor 120 is coupled to the inputs 201 and 202 of a spatial demultiplexer 206. The decision processor 120 receives signal outputs directly from a diversity receiver 156 (shown here as two antenna elements 101 and 102). Although the decision processor 120 is shown as an aid to the spatial demultiplexer 206, it is apparent that the decision processor 120 may be used to separate signals independent of (and in place of) the spatial demultiplexer 206.

For simplicity of the following explanation, the spatial demultiplexer 206 shown in FIG. 15 has only two input ports 201 and 202. Only two transmit signals $s_1(t)$ and $s_2(t)$ are separated. Noise and other sources of interference are considered negligible in this example.

A training sequence is performed to determine the spatial gain characteristics $\beta_{mn}$ of the signals $s_1(t)$ and $s_2(t)$ received at the antennas 101 and 102:

$$\beta = \begin{vmatrix} \beta_{11} & \beta_{12} \\ \beta_{21} & \beta_{22} \end{vmatrix}$$

The signals received at each input port 201 and 202 are $y_1(t)$ and $y_2(t)$, respectively.

$$y_1(t) = \beta_{11} s_1(t) + \beta_{12} s_2(t)$$

$$y_2(t) = \beta_{21} s_1(t) + \beta_{22} s_2(t)$$

Assuming that $s_n(t)$ can have one of two discreet values (1, −1), $y_m(t)$ has one of four values. Assuming that either of the signals $s_n(t)$ may be zero (not transmitting) introduces the following constellation of possible values for each received signal $y_m(t)$:

$$y_{1c} = \beta_{11}+\beta_{12},\ \beta_{11}-\beta_{12},\ -\beta_{11}+\beta_{12},\ -\beta_{11}-\beta_{12},\ \beta_{11},\ -\beta_{11},\ \beta_{12},\ -\beta_{12},\ 0$$

$$y_{2c} = \beta_{21}+\beta_{22},\ \beta_{21}-\beta_{22},\ -\beta_{21}+\beta_{22},\ -\beta_{21}-\beta_{22},\ \beta_{21},\ -\beta_{21},\ \beta_{22},\ -\beta_{22},\ 0$$

The constellation values of $y_{1c}$ and $y_{2c}$ are used for comparison with received signals $y_1(t)$ and $y_2(t)$, respectively. These comparisons may be performed to identify the unknown data symbols $s_n(t)$ and determine the accuracy of the estimated symbols $s'_n(t)$. This results in an assessment of the accuracy of the measured spatial gain distributions $\beta_{mn}$ that are used to calculate the weights in the spatial demultiplexer 206. The accuracy assessment is an important function because the validity of the measured spatial gains $\beta_{mn}$ changes as the relative positions of the transmitters and the multipath environment change.

Each received signal $y_1(t)$ from input 201 is compared to its associated constellation of values $y_{1c}$. Signal $y_2(t)$ from input 202 is compared to constellation $y_{2c}$. Thus, two different comparisons are performed, which reduces the probability of error in the identification of the unknown data symbols $s_n(t)$. Multiple comparisons also improve the precision of the accuracy assessment for the spatial gains $\beta_{mn}$. For example, a measurement of $y_1(t)$ that may be attributed to either of two closely spaced values in the first constellation $y_{1c}$ may be referenced to a similar comparison of $y_2(t)$ and the second constellation $y_{2c}$. For significant differences in spatial gain, the second measurement indicates which constellation point best matches the first measurement. The decision processor 120 provides estimates of the transmitted signals $s'_n(t)$ at outputs 254 and 255.

The decision processor 120 may use algorithms to optimize a relationship based on the distance between measurements $y_m(t)$ and constellation points to determine the values of the data symbols $s_n(t)$ received by the antennas 101 and 102. Similarly, this relationship may be quantified to relate a probability of error to the determination of received data symbols $s_n(t)$ or the validity of measured spatial gains $\beta_{mn}$. When the probability of error exceeds a predefined level, the decision processor 120 may perform a correction process, such as adjusting weights in the spatial demultiplexer 206 or initiating a training session to recalculate weights and constellation values.

Figure 16:
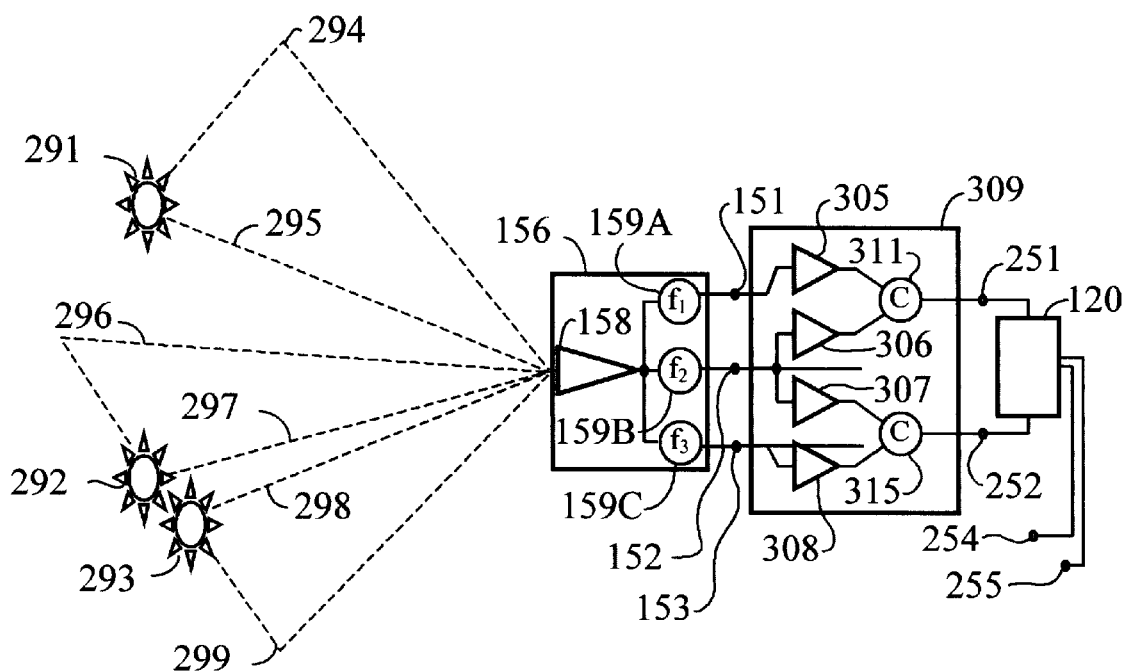
FIG. 16 shows a decision processor coupled to a spatial demultiplexer.

FIG. 16 shows a decision processor 120 coupled to a spatial demultiplexer 309. A diversity receiver 156 receives desired signals $s_1(t)$ and $s_2(t)$ from two transmitters 291 and 292 and an undesired signal $s_3(t)$ from an interfering transmitter 293. Although a frequency diverse receiver 206 is shown, any type of diversity receiver may be used. All of the received signals $s_n(t)$ interfere with each other. Thus, each output 151, 152, and 153 from the receiver 156 has components of the two desired signals $s_1(t)$ and $s_2(t)$ and the undesired signal $s_3(t)$. In this example, the possible values of the undesired signal $s_3(t)$ are assumed to be unknown. Therefore, the possible values of $s_3(t)$ are not figured into the constellation. Rather, the unknown signals $s_3(t)$ are cancelled by the spatial demultiplexer 309, which outputs signals $y_m(t)$ at two output nodes 251 and 252.

The spatial demultiplexer 309 weights and sums the signals received from the diversity receiver 156 to cancel or otherwise remove the undesired signal $s_3(t)$. The output signals $y_m(t)$ of the spatial demultiplexer are combinations of the desired signals:

$$y_1(t) = \beta_{11}\, s_1(t) + \beta_{12}\, s_2(t)$$

$$y_2(t) = \beta_{21}\, s_1(t) + \beta_{22}\, s_2(t)$$

The decision processor 120 receives the signals $y_m(t)$ and compares each signal to a corresponding constellation $y_{mc}$ of data points.

The constellations $y_{mc}$ are created during a training sequence in which weights in the spatial demultiplexer 309 are determined. Because $s_3(t)$ is unknown, a decision feedback process (not shown) may be used to determine the weights required to cancel the signal $s_3(t)$. A training sequence in which the possible values of $s_3(t)$ are determined may be performed to expand the constellations $y_{mc}$.

In the preferred embodiments, several kinds of spatial interferometry are demonstrated in order to provide a basic understanding of diversity reception and spatial demultiplexing. With respect to this understanding, many aspects of this invention may vary. For example, the antenna array may be an array of individual antennas or a multiple-feed single-dish antenna where each feed is considered as an individual antenna element. Although only two- and three-element spatial demultiplexers are shown, spatial demultiplexing processes may be performed on a larger number of inputs. The complexity of the spatial demultiplexer process typically increases for larger numbers of inputs. A CPU may be used to perform the weight and sum operations or equivalent types of cancellation processes that result in separation of the signals. Although the invention is described with regard to RF and microwave frequencies, the principles of operation of the invention apply to any frequency in the electromagnetic spectrum. Additionally, a spatial demultiplexer may include combinations of space, frequency, time, and polarization-diversity combining methods. In this regard, it should be understood that such variations as well as other variations fall within the scope of the present invention, its essence lying more fundamentally with the design realizations and discoveries achieved than merely the particular designs developed.

The foregoing discussion and the claims that follow describe the preferred embodiments of the present invention. With respect to the claims, it should be understood that changes could be made without departing from the essence of the invention. To the extent such changes embody the essence of the present invention, each naturally falls within the breadth of protection encompassed by this patent. This is particularly true for the present invention because its basic concepts and understandings are fundamental in nature and can be broadly applied.

I claim:

1. A method for separating a plurality of received interfering signals comprising:
   measuring a plurality of interference ratios of a plurality of the received signals,
   generating a plurality of weights based on the plurality of measured interference ratios of the received signals, and
   weighting and combining the plurality of received signals using the plurality of weights to enhance a signal-to-interference ratio for at least one of the received signals by canceling at least one interfering signal.

2. The method recited in claim 1 wherein the measured interference ratios are determined by a training sequence.

3. The method recited in claim 1 wherein the interfering signals include noise.

4. The method recited in claim 1 wherein the weights are based on a fading rate.

5. The method recited in claim 1 wherein the plurality of received signals is received from a plurality of spatially diverse receiving elements.

6. The method recited in claim 5 wherein the signals received from the plurality of receiving elements are combined using a beamforming method to produce the plurality of receive signals.

7. The method recited in claim 6 wherein the beamforming method nulls intersymbol interference received by the receiving elements.

8. The method recited in claim 1 wherein the plurality of received signals is received from a temporally diverse receiver.

9. The method recited in claim 1 wherein the plurality of received signals is received from a frequency-diverse receiver.

10. The method recited in claim 1 wherein the desired signal has a plurality of signal frequencies and the weights are frequency dependent.

11. The method recited in claim 1 wherein the received signals are multicarrier signals.

12. The method recited in claim 1 wherein the desired signal is transmitted by a plurality of transmitting elements.

13. The method recited in claim 11 wherein the interference ratios are based on spatial gain distributions that provide for different amplitudes of multicarrier frequency components, the weights being generated for each frequency component.

14. A method for processing a plurality of received interfering signals comprising
   measuring a plurality of interference ratios of a plurality of the received signals,
   generating a plurality of weights based on the measured interference ratios,
   weighting and combining the plurality of received signals using the generated plurality of weights to enhance signal-to-interference of at least one of the received signals by canceling interfering signals, and
   providing adjustment to at least one spatial gain characteristic of the received signals to enhance signal-to-noise-plus-interference of at least one of the received signals.

15. The method recited in claim 14 wherein the step of providing adjustment to the at least one spatial gain characteristic includes adjusting transmission characteristics of at least one antenna that generates one or more of the received signals.

16. The method recited in claim 15 wherein the antenna is an antenna array.

17. The method recited in claim 15 wherein the step of providing adjustment to at least one spatial gain characteristic includes adjusting the beam pattern of the antenna to reduce intersymbol interference in the received signals.

18. The method recited in claim 14 wherein the step of providing adjustment to at least one spatial gain characteristic includes changing at least one beam pattern of at least one antenna that receives the received signals.

19. The method recited in claim 14 wherein the step of providing adjustment to at least one spatial gain characteristic is performed to minimize interference plus noise.

20. An apparatus adapted to separate a plurality of received interfering signals, comprising
   an interference-measurement unit adapted to measure a plurality of ratios of interference between the received signals,
   a weight generation unit capable of generating a plurality of weights based on the ratios of interference, and
   a combining unit capable of weighting the plurality of received signals with the generated plurality of weights and combining the received signals to enhance signal to interference of at least one received signal.

21. The apparatus of claim 20 wherein the ratios of interference are determined by known training symbols in the interfering received signals.

22. The apparatus of claim wherein the ratios of interference are adapted to a fading rate.

23. The apparatus of claim 20 wherein the plurality of received signals are received from a spatially diverse receiver.

24. The apparatus of claim 20 wherein the plurality of received signals are received from a temporally diverse receiver.

25. The apparatus of claim 20 wherein the plurality of received signals are received from a frequency-diverse receiver.

26. The apparatus of claim 25 wherein the frequency-diverse receiver receives signals from a single antenna element.

27. The apparatus of claim 20 wherein the received signals are multicarrier signals.

28. The apparatus of claim 20 wherein the received signals are received from a lens receiver.

29. The apparatus of claim 20 wherein the received signals are received from a plurality of antenna arrays.

30. The apparatus of claim 18 wherein the received signals are received from a plurality of beamforming processors.

31. A communication system adapted to separate a plurality of received, interfering electromagnetic signals, comprising:
   a receiver adapted to be responsive to the electromagnetic signals for generating a plurality of interfering received signals,
   an interference-measurement unit coupled to the receiver and adapted to measure a plurality of ratios of interference between the received signals,
   a weight generation unit coupled to at least one of the receiver and the interference measurement unit, the weight generation unit capable of generating a plurality of weights based on the ratios of interference, and
   a combining unit coupled to at least one of the receiver, the interference measurement unit, and the weight generation unit, the combining unit capable of weighting the plurality of received signals with the generated plurality of weights and combining the received signals to enhance signal to interference of at least one received signal.

32. The communication system recited in claim 31 wherein the receiver includes at least one of a group including a spatially diverse receiver, a temporally diverse receiver, and a frequency-diverse receiver.

33. The communication system recited in claim 31 wherein the receiver includes at least one of a group including a single-element antenna, an antenna array, a plurality of antenna arrays, a plurality of antenna sub-arrays, and a lens receiver.

34. The communication system recited in claim 31 wherein the received signals are multicarrier signals.

35. The communication system recited in claim 31 wherein the received signals are redundantly modulated multicarrier signals.

* * * * *